J. R. STEPHENS.
MOTH-TRAPS.

No. 177,584.    Patented May 16, 1876.

WITNESSES:  
Chas. N. Ida  
John Goethals

INVENTOR:  
J. R. Stephens  
BY  
ATTORNEYS.

UNITED STATES PATENT OFFICE.

JOHN R. STEPHENS, OF LONE STAR, MISSISSIPPI.

IMPROVEMENT IN MOTH-TRAPS.

Specification forming part of Letters Patent No. 177,584, dated May 16, 1876; application filed February 14, 1876.

*To all whom it may concern:*

Figure 1:
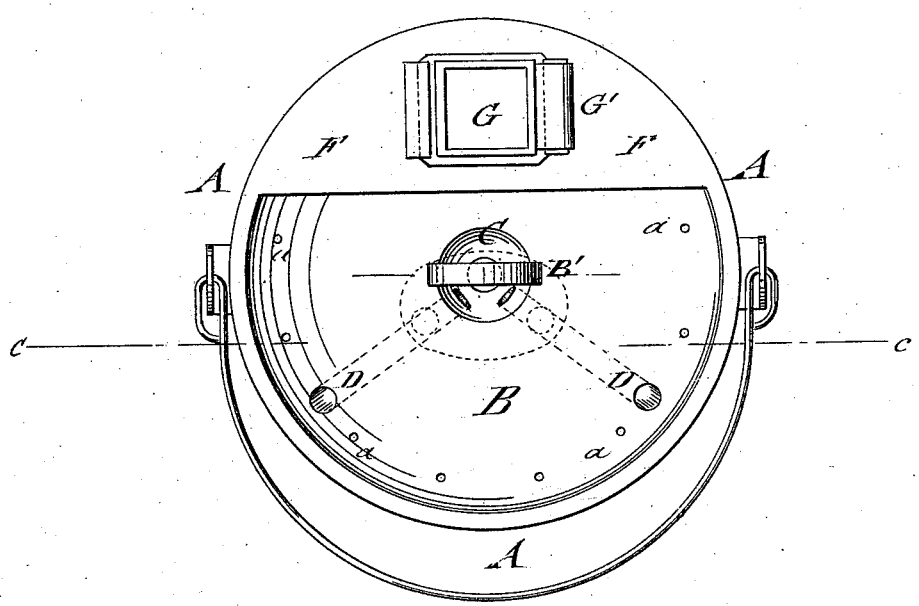
Figure 2:
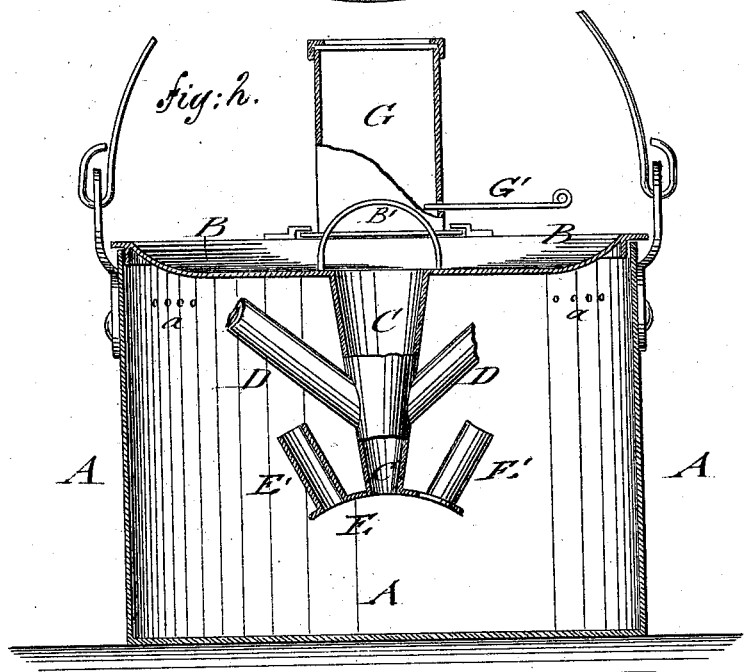

Be it known that I, JOHN R. STEPHENS, of Lone Star, in the county of Itawamba and State of Mississippi, have invented a new and Improved Moth-Trap, of which the following is a specification:

In the accompanying drawing, Figure 1 represents a top view, and Fig. 2 a vertical transverse section on the line $c\ c$ of my improved moth or miller trap.

Similar letters of reference indicate corresponding parts.

The object of my invention is to provide, against the destructive ravages of the moth or miller, an improved trap in which the same is readily caught without a chance of escape; and the invention consists of a vessel with lid or cap, having entrance-tubes, through which the moths pass to the inside, where they are attracted to a lighted box of the cap, with bottom slide for caging and removing them with the box for being killed.

In the drawing, A represents a trap of considerable size, which is filled with a mixture of crushed sorghum-cane, water, vinegar, and molasses, or other similar bait, that attracts by its aciduous smell the moths from a considerable distance. The trap is placed near the bee-hives, the bait in the same tempting the moths to enter.

The trap A is covered with a lid or cap, B, over the greater part of the vessel, and provided with a central aperture and a downward-extending, tapering, or funnel-shaped tube, C, and two or more side tubes, D, that lead from apertures of the lid at suitable inclination toward the central entrance-tube, and open into the same. The moths pass from the lid through the central and side entrance-tubes C and D to the interior of the trap, being prevented from returning by a curved plate, E, at the lower end of the central tube C, which plate is provided with two or more short upward-extending tubes, E', that are intended to misguide and perplex the moths, so that they do not find their way back again in their attempts to escape. Small perforations $a$ in the upper part of the vessel A and in the lid B allow the odors of the sour fluid in the vessel to pass out, so that the moths smell the same, and are tempted to enter through the tubes. The lid B is lifted from the vessel by a broad handle or bail, B', which serves also to darken the central entrance-funnel, so as to render the return of the moths through the tubes more difficult. A part of the top or lid of the vessel supports a raised plate, F, on which is arranged a sliding box or receptacle, G, with a top light and a bottom slide piece, G'. The box serves to cage the moths caught in the trap, which moths will go naturally toward the light; or, in case some are still in the box, they are readily driven into the same by a few gentle raps on the vessel. The bottom slide is then closed and the box removed for destroying the moths caged therein. The bait will remain serviceable for a long time, and needs only to be refilled once in thirty days.

The trap is of simple construction, and forms a reliable device for the destruction of the injurious enemies of the bees.

Having thus described my invention, I claim as new and desire to secure by Letters Patent—

1. A moth-trap made of a vessel with central and side entrance-tubes, and a sliding top box or receptacle, with top light and bottom slide piece, all arranged in the manner and for the purpose set forth.

2. The detachable lid or cap, having central funnel-shaped entrance-tube and inclined side tubes opening into the same, with bottom plate and short false tubes extending therefrom, as and for the purpose described.

JOHN RILEY STEPHENS.

Witnesses:
W. E. HODGES,
A. A. STEPHENS.